United States Patent
Bilby et al.

(10) Patent No.: US 12,384,273 B2
(45) Date of Patent: Aug. 12, 2025

(54) TRACTION BATTERY CONTROLLER OPERABLE TO DETECT BATTERY INTERNAL STATE USING BATTERY MODEL BASED ON COMPREHENSIVE DISTRIBUTION OF RELAXATION TIMES INFORMATION

(71) Applicant: Ford Global Technologies, LLC, Dearborn, MI (US)

(72) Inventors: David Bilby, Royal Oak, MI (US); Nathan Kempema, Grosse Pointe Farms, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 316 days.

(21) Appl. No.: 18/121,998

(22) Filed: Mar. 15, 2023

(65) Prior Publication Data
US 2024/0308388 A1    Sep. 19, 2024

(51) Int. Cl.
*B60L 58/12* (2019.01)

(52) U.S. Cl.
CPC .................... *B60L 58/12* (2019.02)

(58) Field of Classification Search
CPC ............. B60L 58/12; B60L 2240/545; B60L 2240/547; B60L 2240/549; B60L 2260/44
See application file for complete search history.

(56) References Cited

U.S. PATENT DOCUMENTS

| | | | |
|---|---|---|---|
| 11,161,428 B2 | 11/2021 | Wang et al. | |
| 2014/0278167 A1* | 9/2014 | Frost | B60L 58/12 |
| | | | 702/63 |
| 2020/0079230 A1* | 3/2020 | Tenma | B60L 53/22 |
| 2020/0300796 A1 | 9/2020 | Gilbert et al. | |
| 2021/0293867 A1 | 9/2021 | Kobayashi | |

FOREIGN PATENT DOCUMENTS

| | | | | |
|---|---|---|---|---|
| CN | 104914312 A | 9/2015 | | |
| CN | 112327171 A | 2/2021 | | |
| CN | 112327172 A | 2/2021 | | |
| CN | 112540316 A | 3/2021 | | |
| CN | 112816895 A | 5/2021 | | |
| CN | 113138340 A | * 7/2021 | ........... | G01R 31/367 |
| CN | 113484787 A | 10/2021 | | |
| JP | 2018055402 A | 4/2018 | | |
| WO | 2021143592 A1 | 7/2021 | | |
| WO | WO-2022171993 A1 | * 8/2022 | ........... | G01R 31/367 |

OTHER PUBLICATIONS

English Translation of CN-113138340-A (Year: 2025).*

(Continued)

*Primary Examiner* — Erin M Piateski
*Assistant Examiner* — Eisen Yim
(74) *Attorney, Agent, or Firm* — David B. Kelley; Brooks Kushman P.C.

(57) ABSTRACT

A traction battery controller of an electrified vehicle controls the traction battery based in part on a value of a non-linear circuit element of a model of the traction battery in which the value of the non-linear circuit element is estimated in part on distribution of relaxation time (DRT) information of measured impedance data of the traction battery.

11 Claims, 8 Drawing Sheets

(56) References Cited

OTHER PUBLICATIONS

Bernard A. Boukamp, University of Twente, Fac. of Science and Technology & MESA and Institute for Nanotechnology, Distribution (function) of relaxation times, successor to complex nonlinear least squares analysis of electrochemical impedance spectroscopy, published Aug. 13, 2020.

Scientific Reports, T. Paul, et al., Computation of distribution of relaxation times by Tikhonov regularization for Liion batteries: usage of L-curve method, University of Physics, Academia Sinica, 115 Taiwan.

Electrochimica Acta, Ting Hei Wan, et al., Influence of the Discretization Methods on the Distribution of Relaxation Times DeconvolutioTn: Implementing Radial Basis Functions with DRT-tools, Accepted Sep. 17, 2015.

* cited by examiner

FIG. 4C
(Conventional)

FIG. 5C (Conventional)

TRACTION BATTERY CONTROLLER OPERABLE TO DETECT BATTERY INTERNAL STATE USING BATTERY MODEL BASED ON COMPREHENSIVE DISTRIBUTION OF RELAXATION TIMES INFORMATION

TECHNICAL FIELD

The present disclosure relates to detecting an internal state of a traction battery of an electrified vehicle.

BACKGROUND

An electrified vehicle includes a traction battery for providing power to a motor of the vehicle to propel the vehicle. Electrochemical impedance spectroscopy (EIS) is used for detecting an internal state of the traction battery. The detected internal state of the traction battery may be used in controlling the operation of the traction battery and/or the vehicle.

SUMMARY

A method for a vehicle having a traction battery is provided. The method includes controlling the traction battery based in part on a value of a non-linear circuit element of a model of the traction battery in which the value of the non-linear circuit element is estimated in part on distribution of relaxation time (DRT) information of measured impedance data of the traction battery.

The method may further include minimizing a curve area of the DRT information to fit the non-linear circuit element to the measured impedance data in order to estimate the value of the non-linear circuit element according to the DRT information.

The method may further include providing a second model of the traction battery that includes only a single circuit element and fitting a derivative of a portion of the measured impedance data to the single circuit element of the second model in order to estimate the value of the non-linear circuit element according to the DRT information.

The method may further include using a surrogate linear approximation of the non-linear circuit element in order to estimate the value of the non-linear circuit element according to the DRT information.

The non-linear circuit element may model a Warburg-type diffusion of the traction battery.

The model of the traction battery may be an equivalent circuit model (ECM) having the non-linear circuit element and one or more linear circuit elements. In this case, the method may further include controlling the traction battery based further in part on a value of each linear circuit element in which the value of each linear circuit element is estimated in part on the DRT information.

The model of the traction battery may be an ECM having the non-linear circuit element and one or more additional non-linear circuit elements. In this case, the method may further include controlling the traction battery based further in part on a value of each additional non-linear circuit element in which the value of each additional non-linear circuit element is estimated in part on the DRT information.

The method may further include detecting, based in part on the estimated value of the non-linear circuit element, a power capability of the traction battery and controlling a vehicle component according to the power capability of the traction battery.

The method may further include detecting, based in part on the estimated value of the non-linear circuit element, a state-of-charge (SOC) of the traction battery and controlling a vehicle component according to the SOC of the traction battery.

The method may further include detecting, based in part on the estimated value of the non-linear circuit element, a distance-to-empty (DTE) estimation of the vehicle and controlling a vehicle component according to the DTE estimation of the vehicle.

A vehicle having a traction battery and a controller is also provided. The controller is configured to estimate a value of a non-linear circuit element of a model of the traction battery based in part on DRT information of measured impedance data of the traction battery and to control the traction battery based in part on the estimated value of the non-linear circuit element.

A system for a vehicle having a traction battery is also provided. The system includes a controller configured to estimate a value of a non-linear circuit element of a model of the traction battery based in part on DRT information of measured impedance data of the traction battery and to control the traction battery based in part on the estimated value of the non-linear circuit element.

DETAILED DESCRIPTION

Detailed embodiments of the present disclosure are disclosed herein; however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
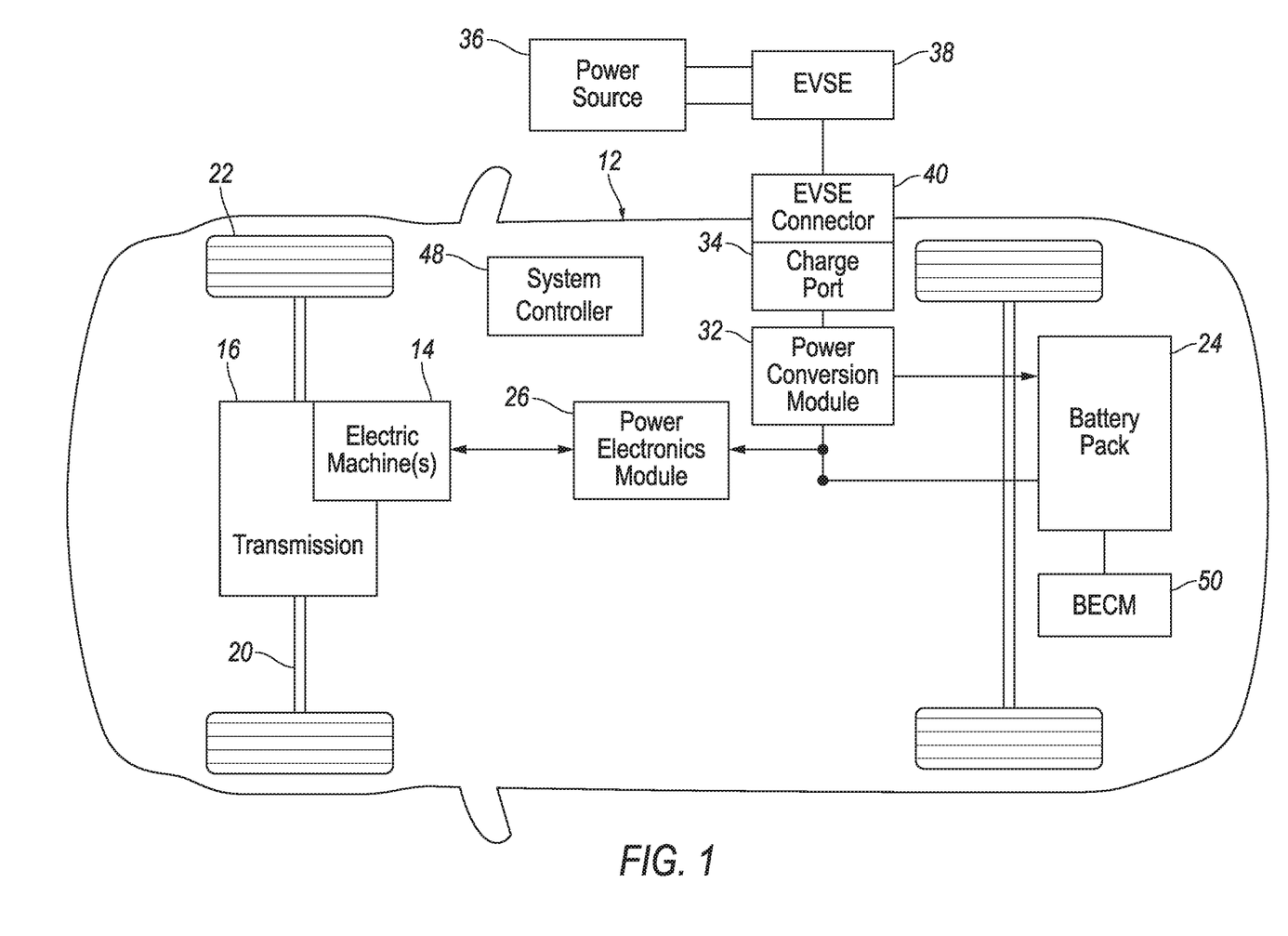
FIG. 1 illustrates a block diagram of a battery electric vehicle (BEV) having a traction battery.

Referring now to FIG. 1, a block diagram of an electrified vehicle 12 in the form of a battery electric vehicle (BEV) is shown. BEV 12 includes a powertrain having one or more traction motors ("electric machine(s)") 14, a traction battery ("battery" or "battery pack") 24, and a power electronics module 26 (e.g., an inverter). In the BEV configuration, traction battery 24 provides all of the propulsion power and the vehicle does not have an engine. In other variations, the electrified vehicle may be a plug-in hybrid electric vehicle (PHEV) further having an engine.

Traction motor 14 is part of the powertrain of BEV 12 for powering movement of the BEV. In this regard, traction motor 14 is mechanically connected to a transmission 16 of BEV 12. Transmission 16 is mechanically connected to a drive shaft 20 that is mechanically connected to wheels 22 of BEV 12. Traction motor 14 can provide propulsion capability to BEV 12 and is capable of operating as a generator. Traction motor 14 acting as a generator can recover energy that may normally be lost as heat in a friction braking system of BEV 12.

Traction battery 24 stores electrical energy that can be used by traction motor 14 for propelling BEV 12. Traction battery 24 typically provides a high-voltage (HV) direct current (DC) output. Traction battery 24 is electrically connected to power electronics module 26. Traction motor 14 is also electrically connected to power electronics module 26. Power electronics module 26, such as an inverter, provides the ability to bi-directionally transfer energy between traction battery 24 and traction motor 14. For example, traction battery 24 may provide a DC voltage while traction motor 14 may require a three-phase alternating current (AC) current to function. Inverter 26 may convert the DC voltage to a three-phase AC current to operate traction motor 14. In a regenerative mode, inverter 26 may convert three-phase AC current from traction motor 14 acting as a generator to DC voltage compatible with traction battery 24.

In addition to providing electrical energy for propulsion of BEV 12, traction battery 24 may provide electrical energy for use by other electrical systems of the BEV such as HV loads like electric heater and air-conditioner systems and low-voltage (LV) loads such as an auxiliary battery.

Traction battery 24 is rechargeable by an external power source 36 (e.g., the grid). External power source 36 may be electrically connected to electric vehicle supply equipment (EVSE) 38. EVSE 38 provides circuitry and controls to control and manage the transfer of electrical energy between external power source 36 and BEV 12. External power source 36 may provide DC or AC electric power to EVSE 38. EVSE 38 may have a charge connector 40 for plugging into a charge port 34 of BEV 12.

A power conversion module 32 of BEV 12, such as an on-board charger having a DC/DC converter, may condition power supplied from EVSE 38 to provide the proper voltage and current levels to traction battery 24. Power conversion module 32 may interface with EVSE 38 to coordinate the delivery of power to traction battery 24.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating BEV 12. Controller 48 may be a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Controller 48 implements a battery energy control module (BECM) 50. BECM 50 is in communication with traction battery 24. BECM 50 is a traction battery controller operable for managing the charging and discharging of traction battery 24 and for monitoring operating characteristics (e.g., the internal state) of traction battery 24. BECM 50 may implement algorithms to measure and/or estimate the operating characteristics of traction battery 24. BECM 50 controls the operation and performance of traction battery 24 based on the operating characteristics of the traction battery. The operation and performance of other systems and components of BEV 12 may be controlled based on the operating characteristics of traction battery 24.

Operating characteristics of traction battery 24 include the charge capacity and the state-of-charge (SOC) of traction battery 24. The charge capacity of traction battery 24 is indicative of the maximum amount of electrical energy that the traction battery may store. The SOC of traction battery 24 is indicative of a present amount of electrical charge stored in the traction battery. The SOC of traction battery 24 may be represented as a percentage of the maximum amount of electrical charge that may be stored in the traction battery.

Another operating characteristic of traction battery 24 is the power capability of the traction battery. The power capability of traction battery 24 is a measure of the maximum amount of power the traction battery can provide or receive for a specified time period. As such, the power capability of traction battery 24 corresponds to discharge and charge power limits which define the amount of electrical power that may be supplied by or to the traction battery at a given time. These limits can be provided to other vehicle controls, for example, through a vehicle system controller (VSC), so that the information can be used by systems that may draw power from or provide power to traction battery 24. Vehicle controls are to know how much power traction battery 24 can provide (discharge) or take in (charge) in order to meet the driver demand and to optimize the energy usage. As such, knowing the power capability of traction battery 24 allows electrical loads and sources to be managed such that the power requested is within the limits that the traction battery can handle.

Figure 2:
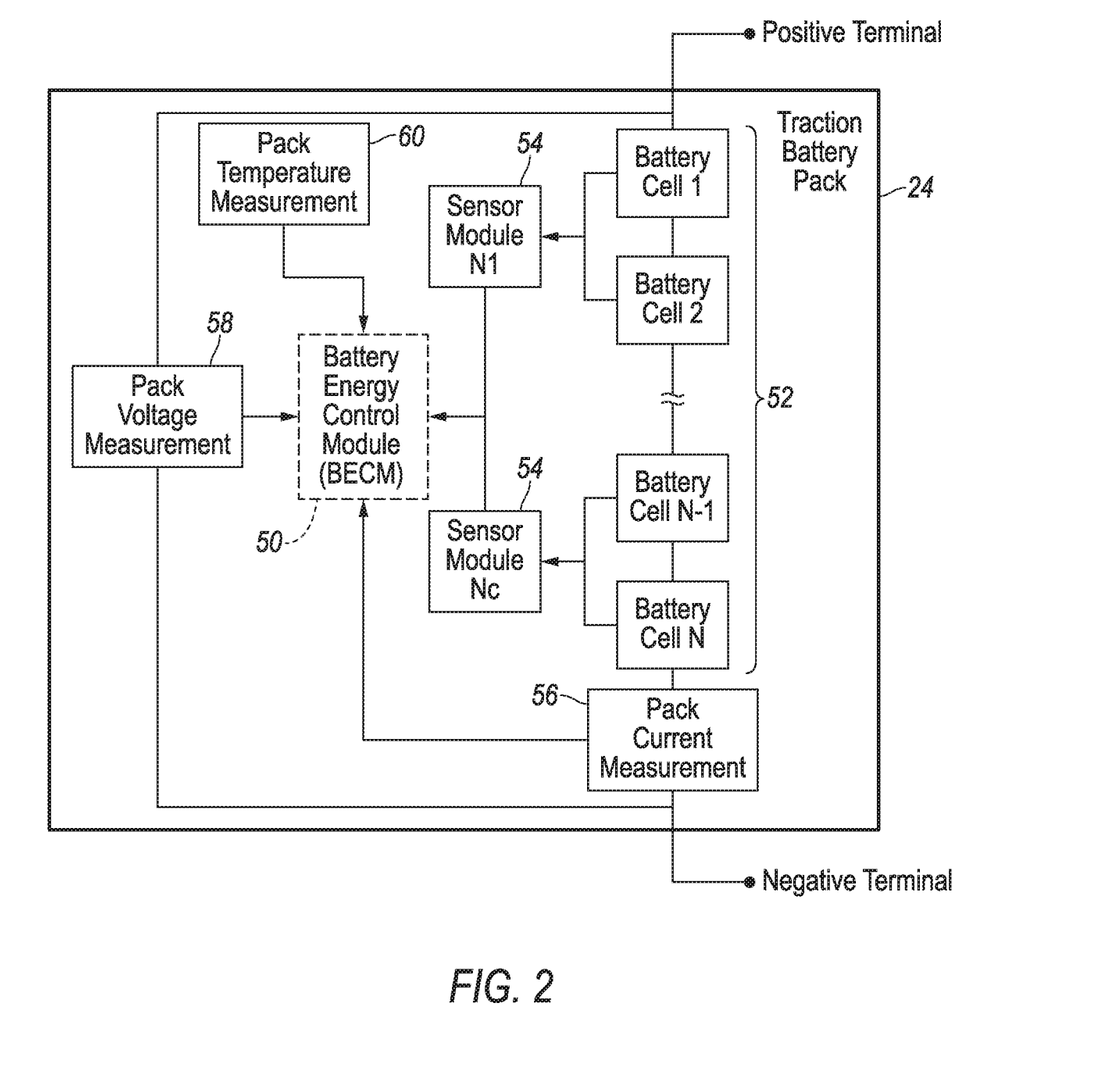
FIG. 2 illustrates a block diagram of an arrangement for a traction battery controller to monitor the traction battery.

Referring now to FIG. 2, with continual reference to FIG. 1, a block diagram of an arrangement for BECM 50 to monitor traction battery 24 is shown. Traction battery 24 is comprised of a plurality of battery cells 52. Battery cells 52 are physically connected together (e.g., connected in series as shown in FIG. 2).

BECM 50 is operable to monitor pack level characteristics of traction battery 24 such as battery current 56, battery voltage 58, and battery temperature 60. Battery current 56 is the current outputted (i.e., discharged) from or inputted (i.e., charged) to traction battery 24. Battery voltage 58 is the terminal voltage of traction battery 24.

BECM 50 is also operable to measure and monitor battery cell level characteristics of battery cells 52 of traction battery 24. For example, terminal voltage, current, and temperature of one or more of battery cells 52 may be measured. BECM 50 may use a battery sensor 54 to measure the battery cell level characteristics. Battery sensor 54 may measure the characteristics of one or multiple battery cells 52. BECM 50 may utilize Nc battery sensors 54 to measure the characteristics of all battery cells 52. Each battery sensor 54 may transfer the measurements to BECM 50 for further processing and coordination. Battery sensor 54 functionality may be incorporated internally to BECM 50.

Traction battery 24 may have one or more temperature sensors such as thermistors in communication with BECM 50 to provide data indicative of the temperature of battery cells 52 of traction battery 24 for the BECM to monitor the temperature of the traction battery and/or the battery cells. BEV 12 may further include a temperature sensor to provide data indicative of ambient temperature for BECM 50 to monitor the ambient temperature.

BECM 50 controls the operation and performance of traction battery 24 based on the monitored traction battery and battery cell level characteristics. For instance, BECM 50 may use the monitored characteristics to detect (i.e., estimate) an internal state (e.g., the charge capacity, the SOC, and/or the power capability) of traction battery 24 such as for use in controlling the traction battery and/or BEV 12.

As known by those of ordinary skill in the art, BECM 50 may detect an internal state of traction battery 24 by using an observer, wherein a battery model (i.e., "equivalent circuit model" (ECM)) is used for construction of the observer, with measurements of battery current, battery terminal voltage, and battery temperature. Values of parameters of the ECM may be identified through recursive estimation based on such measurements.

BECM 50 is configured to deduce an estimate of an internal state of traction battery 24 with use of the ECM. For the internal state estimate to be accurate, the ECM has to accurately model traction battery 24. For the ECM to accurately model traction battery 24, (i) the ECM has to have a set of parameters at least substantially similar to the parameters of an ECM that accurately models traction battery 24 (i.e., from amongst a set of candidate ECMs, a "proper" ECM that is fairly representative of the traction battery has to be initially chosen) and (ii) the estimated values of the parameters of the ECM have to be at least substantially similar to the values of the parameters of the ECM that accurately models the traction battery (i.e., the estimated parameter values have to be at least substantially similar to the actual parameter values).

BECM 50 is configured to implement electrochemical impedance spectroscopy (EIS) to estimate the parameter values of the ECM in order to detect an internal state of traction battery 24. BECM 50 implements EIS to measure impedance of traction battery 24 by applying to the traction battery, across a range of frequencies, a relatively small amplitude current or voltage sinusoid stimulus and measuring the voltage or current response of the traction battery. The impedance data of traction battery 24 is then "fitted" to the ECM to estimate the values of the parameters of the ECM. The goal is to find the ECM parameters which cause the best agreement between an impedance spectrum of the ECM and the impedance data of traction battery 24. However, resolution of the impedance data is typically limited, and arbitrariness and stability of the fitting result are problematic on how to assume the type of ECM to be used.

To alleviate resolution problems with the impedance data, BECM 50 is further configured to convert (i.e., transform) the impedance data into distribution of relaxation times (DRT) information. This conversion converts the discrete impedance data into a continuous function of a relaxation time. In this way, the DRT information is extracted from the impedance data. BECM 50 can use any of known calculation processes to convert the impedance data into the DRT information. The DRT information supports identification of the most accurate ECM and provides a deeper insight into the internal state of traction battery 24.

As set forth, tracking traction battery internal state is useful for optimizing charging rate, controlling traction battery power delivery, monitoring traction battery health including capacity estimation, etc. However, external measurement of traction battery internal state is obscured by long relaxation times and state variables that are defined by integration algorithms. EIS is a technique that promises to rapidly yield information about traction battery internal state by probing the complex electrical response (via the small amplitude current or voltage sinusoid stimulus) across a range of frequencies. However, interpretation of the measured impedance data is challenging because of overlap between various internal processes that contribute to the net measured impedance. This results in difficulty verifying that the proper battery model was selected. This is especially challenging because different models may be required to describe the traction battery impedance under different conditions. Additionally, simple metrics that describe quality of fit of an ECM, such as the coefficient of determination, do not discriminate between various overfit battery models with incorrect circuit elements, leading to degenerate fits and challenges in ascribing parameters to traction battery processes of interest.

Models based on a distribution of relaxation times (DRT) are more flexible to battery condition than conventional equivalent-circuit models. As such, DRT models enable extraction of information which is potentially more useful for traction battery monitoring. However, existing algorithms to calculate the distribution of relaxation times also struggle to separate battery processes which strongly overlap in time or frequency. Naive pre-processing strategies, like omitting data with a cut-and-shift, or like subtracting fitted curves based on equivalent-circuit models, can be applied to exclude certain battery processes. However, such pre-processing of the impedance data is inherently flawed due to the noted data overlap and introduces uncertainty and ambiguity into tracking the traction battery internal state. Alternatively, iteration-based DRT calculation strategies based on Bayesian statistics, genetic algorithms, or basis-function selection optimization produce much more useful fits but are computationally expensive and not practical for on-board traction battery monitoring. The present disclosure proposes a hybrid strategy that is computationally efficient and can accurately capture traction battery processes. This strategy includes arbitrary equivalent-circuit model elements in a DRT calculation, effectively gaining the benefit of the flexible DRT while separating out processes simple enough to be described with equivalent-circuit elements.

In accordance with the present disclosure, BECM 50 is operable to detect the internal state of traction battery 24 using an ECM of the traction battery that is based on comprehensive distribution of relaxation times (DRT) information. In this way, BECM 50 calculates a complete ECM including DRT information. In this regard, BECM 50 implements a process to enhance the versatility of the flexible modeling technique that is used to parameterize measured impedance data of traction battery 24. As noted, one process to model impedance data involves describing the traction battery with a distribution of relaxation times, in addition to series resistance and inductive wiring contributions. Parameterization of this model involves inverting a Fredholm integral equation, which is often solved by discretizing and linearizing the model and performing a Tikhonov regularization. Traction battery 24 embodies an electrochemical system that includes additional electrochemical behavior including diffusion. Consequently, impedance measurements are often convoluted with instrument response and wiring non-idealities.

Further in accordance with the present disclosure, BECM 50 is operable to employ any of three different processes in order to obtain comprehensive DRT information from impedance data of traction battery 24. The obtained DRT information is comprehensive in that BECM 50 includes non-linear (e.g., semi-linear) circuit elements when calculating the DRT information. That is, BECM 50 employs any one of the three processes in order to expand the traditional linearization of the battery model to further include non-linear circuit elements, such as Warburg-type diffusion, which is not possible with conventional processes. This is important for taking advantage of the flexibility of the DRT information in an arbitrary battery model and overcoming previous limitations that required data pre-processing or heavy computation.

As an overview, the present disclosure provides a method for considering non-linear circuit elements during the calculation of the DRT information. To this end, the method involves separately fitting a non-linear parameter in functions describing the impedance of circuit elements that are not linear in all fit parameters. The first of the three processes involves iteratively fitting non-linear parameters to minimize the DRT curve area. The second of the three processes involves partially fitting the derivative of the function to extract the non-linear variable. The third of the three processes involves surrogating linear approximations for circuit elements.

In further detail, the first process involves BECM 50 iteratively optimizing non-linear fit parameters by minimizing the integrated, absolute value of the DRT information in a battery model where the non-linear parameter is constant during the Fredholm inversion. The second process involves BECM 50, at frequencies where overlap between impedance contributors is minimal, fit the ratio of the derivatives of the real and imaginary components of the impedance data to a single-element battery model to extract the non-linear parameter, which can be included as a constant in the Fredholm inversion. The third process involves BECM 50 writing a linearized surrogate function that approximates the behavior of a non-linear circuit element as a function of frequency, over a limited frequency range, and including this in the Fredholm inversion.

The implementation of an appropriate one of the three processes enables a battery model to fit the entire impedance data under at least substantially all measurement conditions, thereby accommodating overlap between contributors and accommodating semi-linear elements such as constant phase elements (CPEs), finite-diffusion Warburg elements, and their fractal forms. Once this all-inclusive battery model is obtained with this technique, BECM 50 can evaluate the validity of the battery model by three metrics: 1) traditional coefficient of determination describing the quality of the fit relative to the impedance data; 2) comparison between distribution of relaxation time functions obtained with different inversion algorithms (e.g., using a singular value decomposition (SVD) or a quadratic-form equation solver, or imposing radial basis functions, derivative penalties, or non-negative constraints), possibly using a coefficient of determination between them; and 3) integration of the total amount of negative area under the distribution of relaxation times, as an indicator of poor battery model compatibility with the measured impedance data.

The measured impedance data of traction battery 24 takes the form of a curve when plotted (e.g., a Nyquist plot having the real component of the impedance "Z" at each measured frequency along an x-axis and having the imaginary component of the impedance Z at each measured frequency along a y-axis). As set forth, one way to simplify the interpretation of the EIS information is to use an ECM that reproduces the shape of the curve. Circuit elements of the ECM are ascribed to certain processes or physical layers within traction battery 24.

Figure 3:
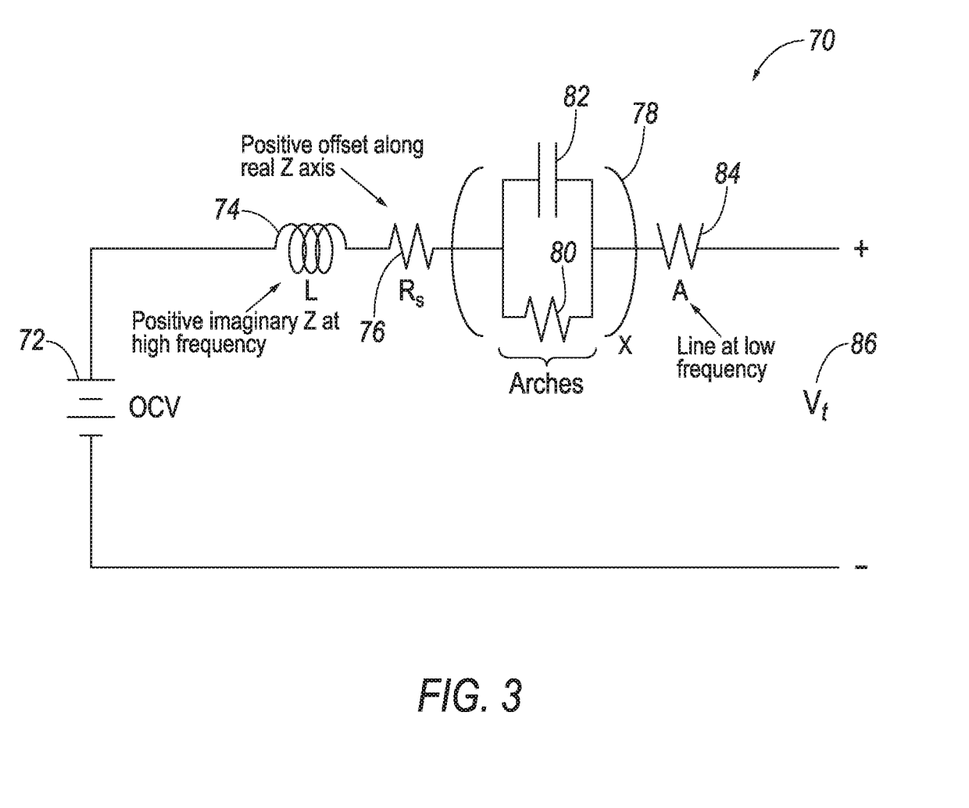
FIG. 3 illustrates a schematic diagram of an equivalent circuit model (ECM) of the traction battery.

Referring now to FIG. 3, a schematic diagram of an ECM 70 of traction battery 24 is shown. Traction battery 24 may be modeled as a circuit, as indicated, and ECM 70 is one possible traction battery ECM. As noted, an ECM includes one or more circuit elements (i.e., one or more "parameters"). Per ECM 70, traction battery 24 is modeled as a circuit having in series a voltage source ("$V_{oc}$") (open-circuit voltage (OCV)) 72, an inductor ("L") 74, a resistor ("$R_S$") 76, one or more RC circuit elements 78 each circuit element including a resistor ("$R_x$") 80 and a capacitor ("$C_x$") 82 connected in parallel, and a constant phase element (CPE) ("A") 84. Voltage ("$V_t$") 86 is the voltage across the terminals of traction battery 24 (i.e., the terminal voltage).

The parameters of ECM 70 include L, $R_S$, $R_X$, $C_X$, and A. These parameters are to have values whereby the calculated impedance of the ECM corresponds to the measured impedance of traction battery 24. As such, it is required that (i) ECM 70 be an ECM having a proper set of parameters in correspondence with traction battery 24 (e.g., ECM 70 has an appropriate amount of RC circuit elements 78 and has CPE 84) and (ii) the values of the parameters of ECM 70 be accurate so that ECM 70 accurately models the behavior of traction battery 24.

An equation for the impedance (Z) of ECM 70 is as follows:

$$Z = i\omega L + R_s + \left(\cfrac{1}{\cfrac{1}{R_x} + Q_x(i\omega)^n}\right) + \frac{A}{\sqrt{\omega}} + \frac{A}{i\sqrt{\omega}}$$

The trouble with the equivalent circuit analysis is that (i) there are relatively many parameters (heavily overlapping in frequency space means lots of interaction), (ii) model fitting is heavily dependent on initial parameters (global optimization helps, but it is not clear that unique solutions can be identified reproducibly), and (iii) model selection is somewhat arbitrary and may not work for all measurement environments. A possibility to overcome sensitivity to model selection is to use a 'distribution of relaxation times' (DRT) to describe the arch region of the measured impedance data curve of the Nyquist plot.

An equation for converting (i.e., transforming) the arch region of the measured impedance data curve to DRT information is as follows:

$$Zarches(\omega) = R_{polarization} \int \frac{G(\log(\tau))}{1 + j\omega\tau} d(\log(\tau))$$

Transforming from the frequency space w to the relaxation time space t looks like an infinite set of parallel RC circuit elements.

In accordance with the present disclosure, effective ways to extract the DRT information from the measured impedance data are provided. In this regard, as noted, in accordance with the present disclosure, non-linear circuit elements are included when calculating the DRT information from the measured impedance data.

Reliably extracting information from impedance data requires appropriate battery model selection. Distribution of relaxation times (DRT) and equivalent circuit model (ECM) fitting are both sensitive to this. Fitting the DRT using a Tikhonov regularization method requires linearization of circuit elements with respect to fit variables.

A list of impedance variables for the circuit elements of an ECM is as follows (of course, this ECM is an exemplary ECM and the circuit elements listed below are not exhaustive of all common ECM circuit elements used in battery modeling):

$$Z_R = R \quad \text{(linear in } R\text{)}$$

$$Z_W(\omega) = \frac{A}{\sqrt{\omega}} + \frac{A}{i\sqrt{\omega}} \quad \text{(linear in } A\text{)}$$

$$Z_{W,t}(\omega) = \frac{A}{\sqrt{i\omega}} \tanh(B\sqrt{i\omega}) \quad \text{(linear in } A\text{; non-linear in } B\text{))}$$

-continued $$Z_L(\omega) = i\omega L \quad \text{(linear in } L\text{)}$$

$$Z_{RC}(\omega) = \frac{R}{1 + i\omega CR} \quad \text{(linear in } R\text{; non-linear in } RC\text{)}$$

$$Z_{RL}(\omega) = \frac{i\omega R}{\frac{R}{L} + i\omega} \quad \text{(linear in } R\text{; non-linear in } R/L\text{))}$$

$$Z_{CPE} = \frac{1}{Q(i\omega)^n} \quad \text{(linear in } 1/Q\text{; non-linear in } n\text{)}$$

The three processes separately employable by BECM 50 to semi-linearize circuit elements in order to obtain comprehensive DRT information from impedance data of traction battery 24 will now be described in further detail. These processes are strategies to semi-linearize circuit elements.

The first process involves BECM 50 iteratively fitting non-linear parameters to minimize the DRT curve area. To this end, BECM 50 includes linear fit variable in DRT extraction while holding the non-linear variable as a constant. External to the DRT algorithm, BECM 50 uses an iterative optimization algorithm to find the non-linear variable (choosing the objective function is important for this to work: for instance, the total integrated area under the DRT curve is minimized, or the area under the DRT curve in the frequency range where the circuit element is presumed dominant is minimized).

The second process, applicable when the contributors are easily separable, involves BECM 50 fitting a portion of EIS derivative to extract non-linear parameters. (The assumption is that the impedance is dominated by certain contributors in certain frequency ranges with the caveat that there is often strong overlap between contributors to impedance as a function of frequency, so this assumption should be verified.) To this end, BECM 50 parametrizes the contributors to impedance by equivalent circuit elements. In this regard, BECM 50 separates real and imaginary components of impedance data and equivalent circuit elements; takes the derivative of real and imaginary components with respect to angular frequency; takes the ratio of derivatives of the real and imaginary components (this leads to elimination of dependence on linearizable coefficients); fits circuit model derivative ratio to data derivative ratio to extract non-linearizable parameters in regions of data that can be described solely by that circuit element; and includes non-linearizable parameter as fixed value in functional form of circuit element, and includes that circuit element in the model used to extract the distribution of relaxation times.

The third process involves BECM 50 using surrogate linear approximations for circuit elements. To this end, BECM 50 includes functional forms that approximate the real and imaginary components of a circuit element over a relevant range of fit parameters.

Figure 4A:
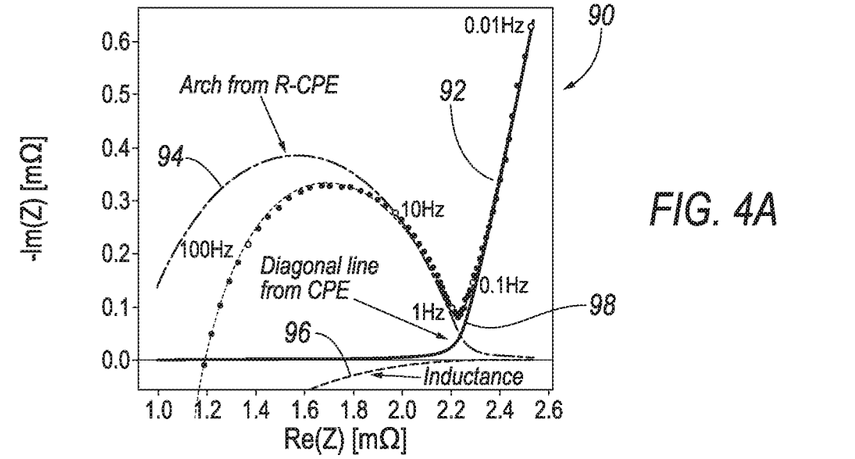
FIG. 4A illustrates a Nyquist graph including a plot of measured impedance data of the traction battery.
Figure 4B:
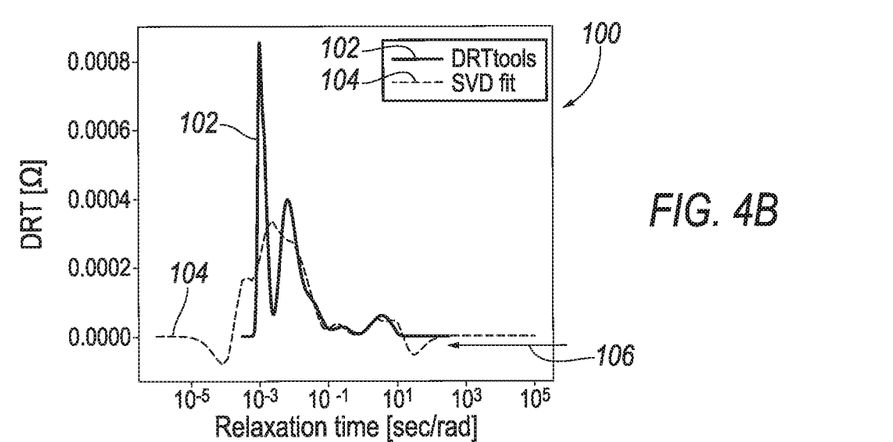
FIG. 4B illustrates a graph including (i) a first plot of distribution of relaxation times (DRT) information extracted from the impedance data by using a first process in accordance with the present disclosure with a conventional DRT calculation being used to convert the impedance data into the DRT information and (ii) a second plot of DRT information extracted from the impedance data by using the first process in accordance with the present disclosure with a conventional singular value decomposition (SVD) calculation being used to convert the impedance data into the DRT information.
Figure 4C:
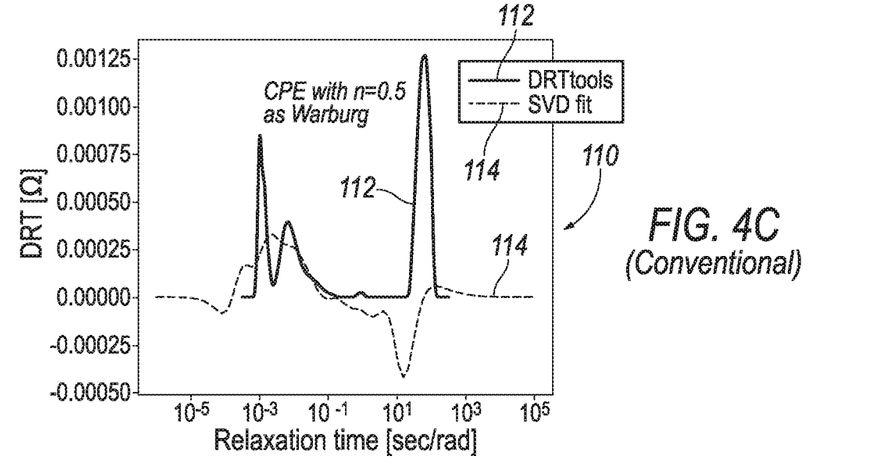
FIG. 4C illustrates a graph including (i) a first plot of DRT information extracted from the impedance data by using a conventional process with the conventional DRT calculation being used to convert the impedance data into the DRT information and (ii) a second plot of DRT information extracted from the impedance data by using the conventional process with the conventional SVD calculation being used to convert the impedance data into the DRT information.

Referring now to FIGS. 4A, 4B, and 4C, with continual reference to FIG. 3, an illustrative example of the strategy of the first process to semi-linearize circuit elements will now be described. FIG. 4A illustrates a Nyquist graph 90 including a plot 92 of measured impedance data of traction battery 24. BECM 50 uses EIS on traction battery 24 to obtain the measured impedance data. For reference, Nyquist graph 90 includes an additional plot 94 indicative of a constant phase element (CPE) impedance component, an additional plot 96 indicative of the inductance impedance component, and an additional plot 98 indicative of another CPE impedance component.

According to the first process, to extract DRT information from the impedance data, BECM 50 iteratively selects the CPE exponent "n" that minimizes the trapezoidal integration of the SVD DRT vs log $10(t)$ and uses this n in DRTtools as well. In this example, the CPE exponent n that minimizes the trapezoidal integration via optimization of DRT is n=0.79 and via ECM fit is n=0.72.

The results are shown in FIG. 4B which illustrates a graph 100 including (i) a first plot 102 of DRT information extracted from the impedance data by using the first process with a conventional DRT calculation being used to convert the impedance data into the DRT information and (ii) a second plot 104 of DRT information extracted from the impedance data by using the first process with a conventional SVD calculation being used to convert the impedance data into the DRT information. As indicated by reference arrow 106 in FIG. 4B, the minimization algorithm rejects most low frequency DRT content, but does not fully remove all low frequency content. This is an indication of whether the initial battery model choice is correct.

For comparison with the results shown in graph 100 of FIG. 4B, FIG. 4C illustrates a graph 110 including (i) a first plot 112 of DRT information extracted from the impedance data by using a conventional process with the conventional DRT calculation being used to convert the impedance data into the DRT information and (ii) a second plot 114 of DRT information extracted from the impedance data by using the conventional process with the conventional SVD calculation being used to convert the impedance data into the DRT information. The conventional process is conventional in that the value for the CPE exponent n is chosen based on the functional form for infinite Warburg diffusion, n=0.5.

Figure 5A:
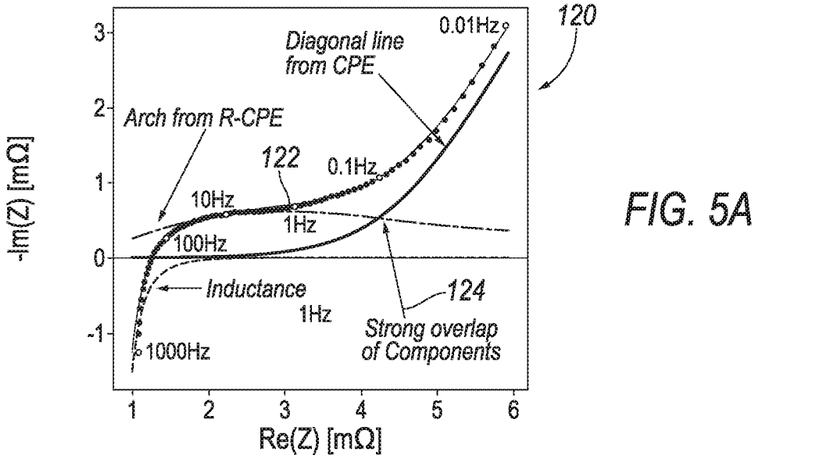
FIG. 5A illustrates a Nyquist graph including a plot of second measured impedance data of the traction battery.
Figure 5B:
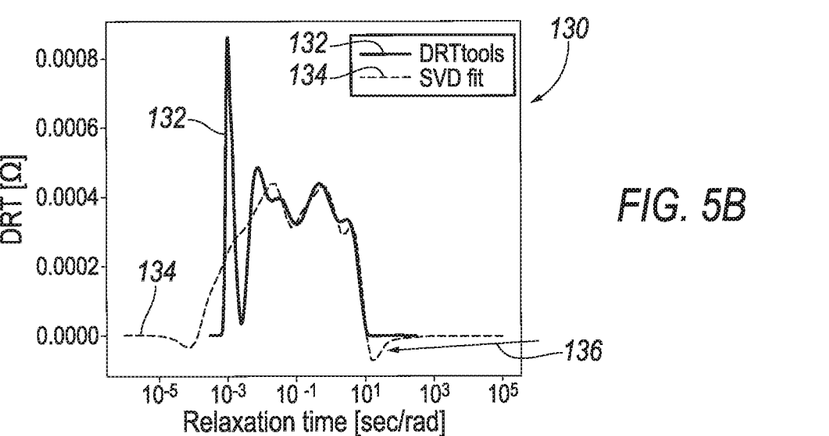
FIG. 5B illustrates a graph including (i) a first plot of DRT information extracted from the second impedance data by using the first process in accordance with the present disclosure with the conventional DRT calculation being used to convert the second impedance data into the DRT information and (ii) a second plot of DRT information extracted from the second impedance data by using the first process in accordance with the present disclosure with the conventional SVD calculation being used to convert the second impedance data into the DRT information.
Figure 5C:
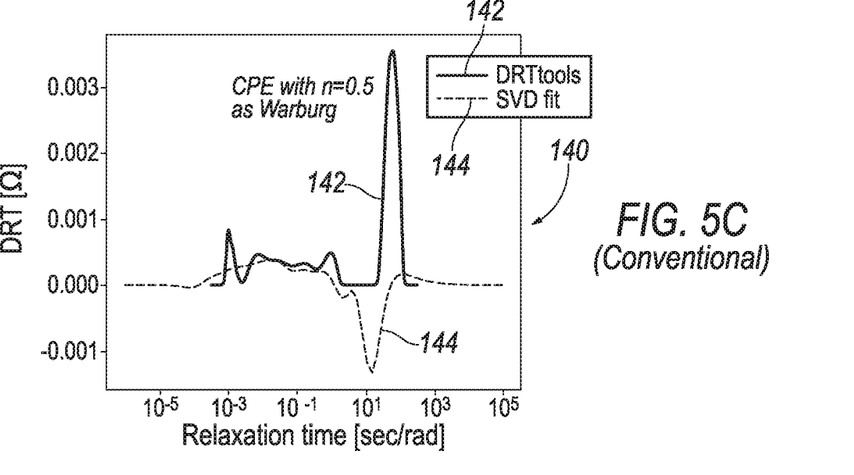
FIG. 5C illustrates a graph including (i) a first plot of DRT information extracted from the second impedance data by using the conventional process with the conventional DRT calculation being used to convert the second impedance data into the DRT information and (ii) a second plot of DRT information extracted from the second impedance data by using the conventional process with the conventional SVD calculation being used to convert the impedance data into the DRT information.

Referring now to FIGS. 5A, 5B, and 5C, with continual reference to FIGS. 3, 4A, 4B, and 4C, another illustrative example of the strategy of the first process to semi-linearize circuit elements will now be described. FIG. 5A illustrates a Nyquist graph 120 including a plot 122 of measured impedance data of traction battery 24. For reference, Nyquist graph 120 includes additional plots (not labeled) indicative of the CPE impedance component, the inductance impedance component, and the other CPE impedance component. As indicated by reference arrow 124 in FIG. 5A, there is a strong overlap of the impedance components.

Again, according to the first process, to extract DRT information from the impedance data, BECM 50 iteratively selects the CPE exponent "n" that minimizes the trapezoidal integration of the SVD DRT vs log $10(t)$ and uses this n in DRTtools as well. In this example, the CPE exponent n that minimizes the trapezoidal integration via optimization of DRT is n=0.70 and via ECM fit is n=0.71. The comparison between the hybrid DRT model and the ECM exponent fits is a validation of the DRT algorithm strategy.

The results are shown in FIG. 5B which illustrates a graph 130 including (i) a first plot 132 of DRT information extracted from the impedance data by using the first process with the conventional DRT calculation being used to convert the impedance data into the DRT information and (ii) a second plot 134 of DRT information extracted from the impedance data by using the first process with the conventional SVD calculation being used to convert the impedance data into the DRT information. As indicated by reference arrow 136 in FIG. 5B, optimization of the CPE exponent has minimized (but not eliminated) low frequency content in the DRT information.

For comparison with the results shown in graph 130 of FIG. 5B, FIG. 5C illustrates a graph 140 including (i) a first plot 142 of DRT information extracted from the impedance data by using the conventional process with the conventional DRT calculation being used to convert the impedance data into the DRT information and (ii) a second plot 144 of DRT information extracted from the impedance data by using the conventional process with the conventional SVD calculation being used to convert the impedance data into the DRT information. Again, the conventional process is conventional in that the value for the CPE exponent n is chosen based on the functional form for infinite Warburg impedance, n=0.5.

An example of the strategy of the second process to semi-linearize circuit elements will now be described. Consider the capacitive constant phase element (CPE) defined by the equation:

$$Z_{CPE} = \frac{1}{Q(\omega)^n} \exp\left(-i\frac{\pi}{2}n\right)$$

This element is isomorphic with the semi-infinite Warburg, excepting that the latter uses n=0.5 and $A=\exp(-i\pi/4)/Q$. Sometimes, the phase of the diffusion limited part of an EIS impedance data curve is not $-90°$, so it would be good to include the flexibility of a constant phase element.

Figure 6A:
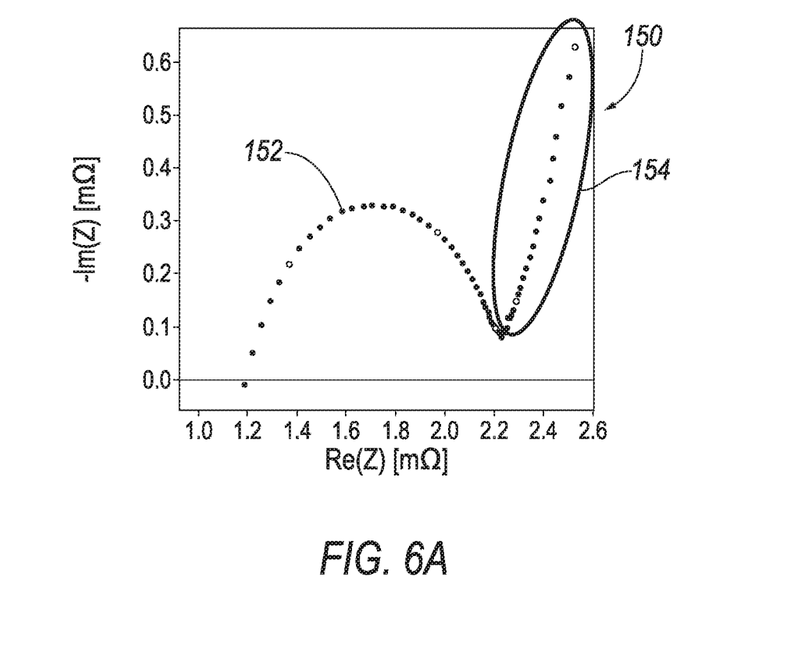
FIG. 6A illustrates a Nyquist graph including a plot of third measured impedance data.

(1) At low frequency, impedance is assumed to be dominated by diffusion, so it is assumed that the CPE will be the only contributor in those frequencies. FIG. 6A illustrates a Nyquist graph 150 having a plot 152 of measured impedance data. Reference arrow 154 indicates the portion of the low-frequency impedance data in which it is assumed to be dominated by diffusion and parameterized by the CPE.

For reference, Euler's identity and some trigonometric identities are provided as follows:

$$e^{ix} = \cos(x) + i\sin(x)$$
$$\cos(-x) = \cos(x)$$
$$\sin(-x) = -\sin(x)$$

(2) The real part and the imaginary part of the impedance of the circuit element are separated:

$$Z_{CPE} = \frac{1}{Q(\omega)^n}\left(\cos\left(-\frac{\pi}{2}n\right) + i\sin\left(-\frac{\pi}{2}n\right)\right)$$
$$\text{Re}(Z_{CPE}) = \frac{1}{Q}(\omega)^{-n}\cos\left(\frac{\pi}{2}n\right)$$
$$\text{Im}(Z_{CPE}) = \frac{-1}{Q}(\omega)^{-n}\sin\left(\frac{\pi}{2}n\right)$$

(3) The derivative is then taken with respect to angular frequency:

$$\frac{d}{d\omega}\text{Re}(Z_{CPE}) = \frac{-n}{Q}(\omega)^{(-n-1)}\cos\left(\frac{\pi}{2}n\right)$$
$$\frac{d}{d\omega}\text{Im}(Z_{CPE}) = \frac{n}{Q}(\omega)^{(-n-1)}\sin\left(\frac{\pi}{2}n\right)$$

(4) The ratio of the derivatives is then taken to eliminate linearizable coefficients:

$$\frac{\frac{d}{d\omega}\text{Im}(Z_{CPE})}{\frac{d}{d\omega}\text{Re}(Z_{CPE})} = \frac{\frac{n}{Q}(\omega)^{(-n-1)}\sin\left(\frac{\pi}{2}n\right)}{\frac{-n}{Q}(\omega)^{(-n-1)}\cos\left(\frac{\pi}{2}n\right)} = \frac{\sin\left(\frac{\pi}{2}n\right)}{\cos\left(\frac{\pi}{2}n\right)} = \tan\left(-\frac{\pi}{2}n\right)$$

The inverse of this data ratio of the derivatives should be used, depending on proximity to an asymptote.

(5) The model is then fitted to the data ratio of the derivatives to extract a non-linearizable parameter:

$$\frac{d\text{Im}(Z_{CPE})}{d\text{Re}(Z_{CPE})} = S = \tan\left(-\frac{\pi}{2}n\right)$$

$$n(S) = \frac{2}{\pi}a\tan(-S)$$

The CPE exponent "n" is a function of the slope of the impedance. Propagation of error is used to find the standard deviation of the exponent due to variation of slope; this puts bounds on the sensitivity of the extracted exponent to experimental noise.

$$\sigma_n^2 = \left(\frac{d}{dS}n(S)\right)^2 \sigma_S^2$$

$$\frac{d}{dx}a\tan(x) = \frac{1}{1+x^2}$$

$$\frac{dn(S)}{dS} = \frac{-2}{\pi}\frac{1}{1+S^2}$$

Figure 6B:
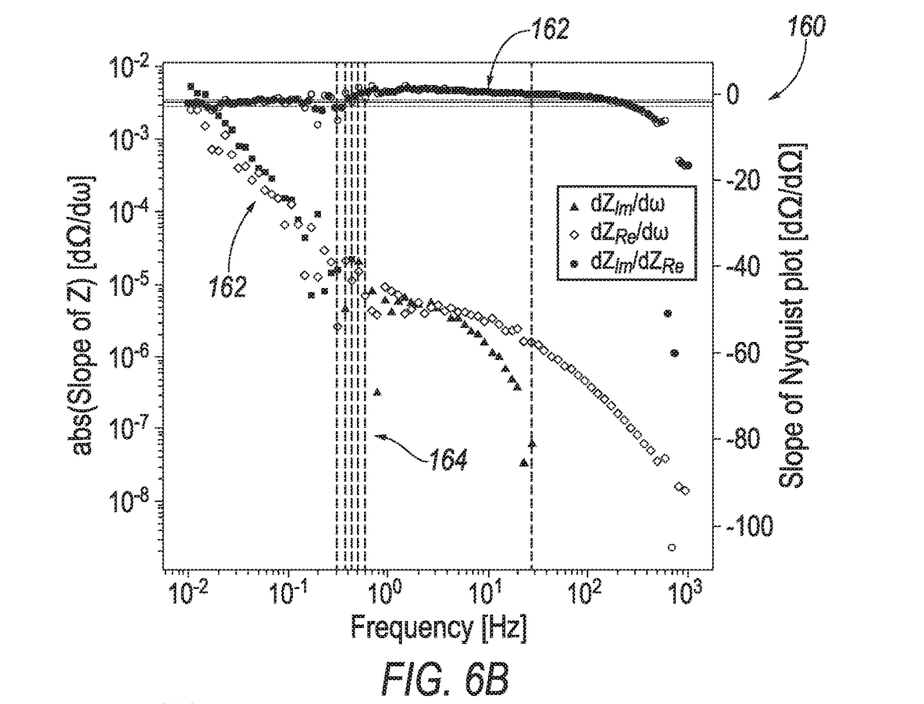
FIG. 6B illustrates a graph including a plot of the ratio of the slope of the real impedance over the imaginary impedance for the third measured impedance data.

FIG. 6B illustrates a graph 160 having a plot 162 of the ratio of the slope of the real impedance over the imaginary impedance for the measured impedance data plotted in Nyquist graph 150. Reference arrow 162 of graph 160 indicates the slope of the real impedance over the imaginary impedance. Reference arrow 164 of graph 160 calls out points where the slope crosses zero. The lowest frequency zero crossing is the frequency limit for the diffusion limited impedance.

Figure 6C:
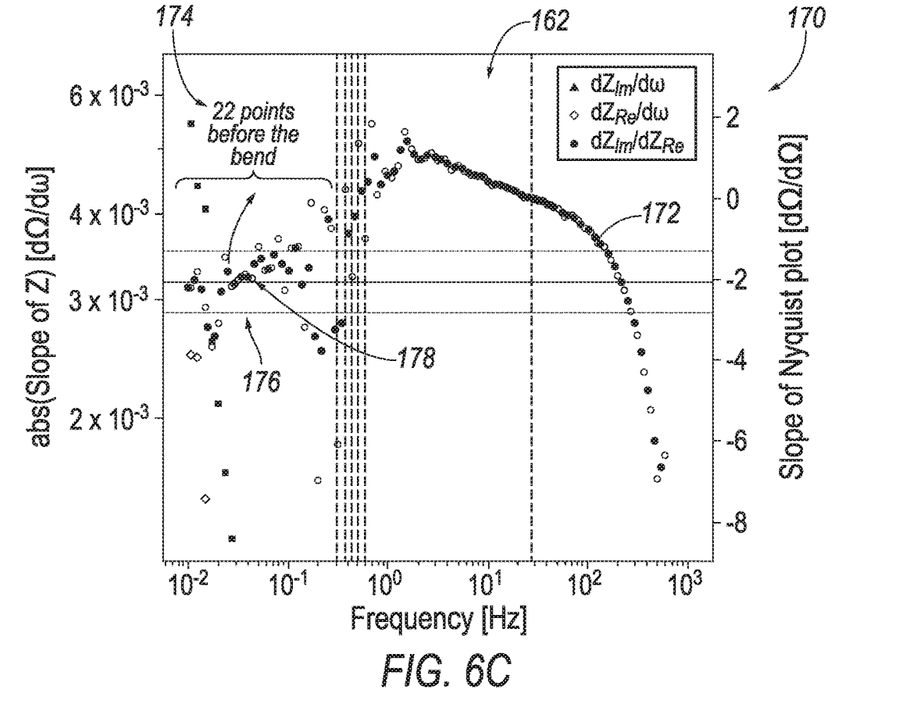
FIG. 6C illustrates a magnified graph portion including a plot of a portion of the ratio of the slope of the real impedance over the imaginary impedance for the third measured impedance data.

(5.1) The slope is then checked to confirm whether the slope has frequency dependence described by functional form (i.e., expect a flat line) and the average slope is taken over all points before the bend of impedance data plot 152 in Nyquist graph 150. FIG. 6C illustrates a magnified graph portion 170 having a plot 172 of a portion the ratio of the slope of the real impedance over the imaginary impedance for the measured impedance data plotted in Nyquist graph 150. Reference arrow 174 indicates that there are twenty-two impedance data points before the bend of impedance data plot 152 in Nyquist graph 150. Reference arrow 176 indicates the standard deviation of these twenty-two impedance data points and reference arrow 178 indicates the mean of these twenty-two impedance data points. In this case, n=0.71±0.09 over the twenty-two impedance data points.

(6) The non-linearizable parameter is then included as a fixed value in DRT extraction algorithm. The equation for the CPE with the fixed exponent n=0.71:

$$Z(\omega) + R + j\omega L + \frac{1}{Q(i\omega)^{0.71}} + \sum_i x_i \int \frac{\phi(y)}{1+j\omega\tau} d(\log(\tau))$$

The equation for the real part of the impedance:

$$Z'(\omega) + R + \frac{1}{Q}(\omega)^{-0.71}\cos\left(\frac{\pi}{2}0.71\right) + \sum_i x_i \int \frac{\phi(y)}{1+\omega^2\tau^2} d(\log(\tau))$$

The equation for the imaginary part of the impedance:

$$Z''(\omega) = \omega L - \frac{1}{Q}(\omega)^{-0.71}\sin\left(\frac{\pi}{2}0.71\right) + \sum_i x_i \int \frac{\phi(y)\cdot(-1\cdot\omega\tau)}{1+\omega^2\tau^2} d(\log(\tau))$$

A coefficient matrix for the real and imaginary parts of the impedance:

$$\begin{bmatrix} 1 & 0 & \frac{\cos\left(\frac{\pi}{2}0.71\right)}{(\omega_1)^{0.71}} & C_{1,1} & \cdots & C_{1,m} \\ 1 & 0 & \frac{\cos\left(\frac{\pi}{2}0.71\right)}{(\omega_2)^{0.71}} & C_{2,1} & \cdots & C_{2,m} \\ 1 & 0 & \frac{\cos\left(\frac{\pi}{2}0.71\right)}{(\omega_3)^{0.71}} & C_{3,1} & \cdots & C_{3,m} \\ 1 & 0 & \frac{\cos\left(\frac{\pi}{2}0.71\right)}{(\omega_4)^{0.71}} & C_{4,1} & \cdots & C_{4,m} \\ \vdots & \vdots & \vdots & \vdots & \ddots & \vdots \\ 1 & 0 & \frac{\cos\left(\frac{\pi}{2}0.71\right)}{(\omega_n)^{0.71}} & C_{n,1} & \cdots & C_{n,m} \\ 0 & \omega_1 & \frac{-\sin\left(\frac{\pi}{2}0.71\right)}{(\omega_1)^{0.71}} & D_{1,1} & \cdots & D_{1,m} \\ 0 & \omega_2 & \frac{-\sin\left(\frac{\pi}{2}0.71\right)}{(\omega_2)^{0.71}} & D_{2,1} & \cdots & D_{2,m} \\ 0 & \omega_3 & \frac{-\sin\left(\frac{\pi}{2}0.71\right)}{(\omega_3)^{0.71}} & D_{3,1} & \cdots & D_{3,m} \\ 0 & \omega_4 & \frac{-\sin\left(\frac{\pi}{2}0.71\right)}{(\omega_4)^{0.71}} & D_{4,1} & \cdots & D_{4,m} \\ \vdots & \vdots & \vdots & \vdots & \ddots & \vdots \\ 0 & \omega_n & \frac{-\sin\left(\frac{\pi}{2}0.71\right)}{(\omega_n)^{0.71}} & D_{n,1} & \cdots & D_{n,m} \end{bmatrix} * \begin{bmatrix} R_s \\ L \\ 1/Q \\ x_1 \\ \vdots \\ x_m \end{bmatrix} = \begin{bmatrix} Z'(\omega_1) \\ Z'(\omega_2) \\ Z'(\omega_3) \\ Z'(\omega_4) \\ \vdots \\ Z'(\omega_n) \\ Z''(\omega_1) \\ Z''(\omega_2) \\ Z''(\omega_3) \\ Z''(\omega_4) \\ \vdots \\ Z''(\omega_n) \end{bmatrix}$$

Once this coefficient matrix is calculated, the DRT and fit parameters are solved for using Tikhonov regularization. The solution may then be plotted with the assumption of impedance being dominated by a single circuit element being checked.

An example of the strategy of the third process to semi-linearize circuit elements will now be described. Under certain circumstances, surrogate functional forms which are linear in fit variables may be substituted into the DRT fitting algorithm. For example, consider the finite, reflective boundary condition Warburg defined by the equation:

$$Z_{W,r} = \frac{A}{\sqrt{i\omega}}\frac{1}{\tanh(B\sqrt{i\omega})}$$

This function is not linear in B, but its form can be approximated in the low frequency limit according to the equation:

$$Z_{W,r} \sim \left(a\omega^3 + b\omega^2 + c\omega + d\right) + i\left(\frac{e}{\omega}\right)$$

The compromise of the high frequency fit is acceptable when (i) the impedance of surrogate function is much lower than other circuit element contributors where deviation from ideal behavior is large and (ii) the frequency range of data is limited to the area where surrogate follows ideal behavior.

Figure 7A:
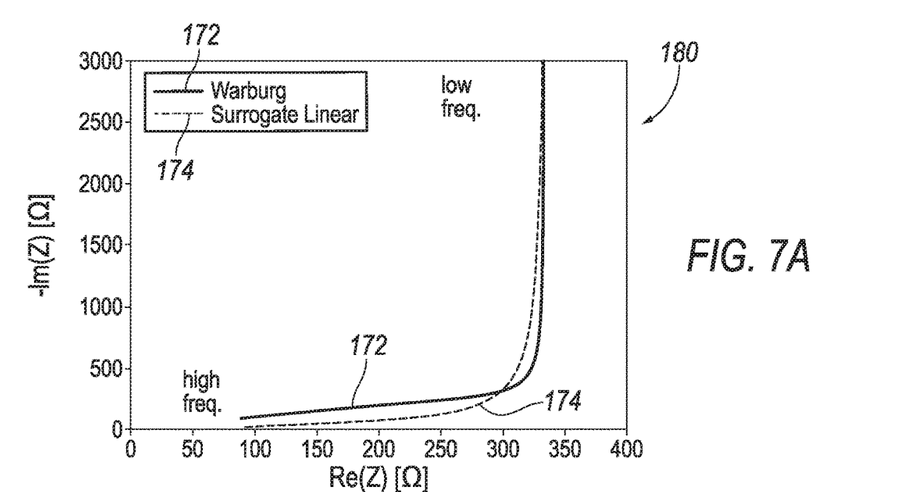
FIG. 7A illustrates a Nyquist graph having a plot of Warburg impedance data and a plot of a surrogate linear impedance data.
Figure 7B:
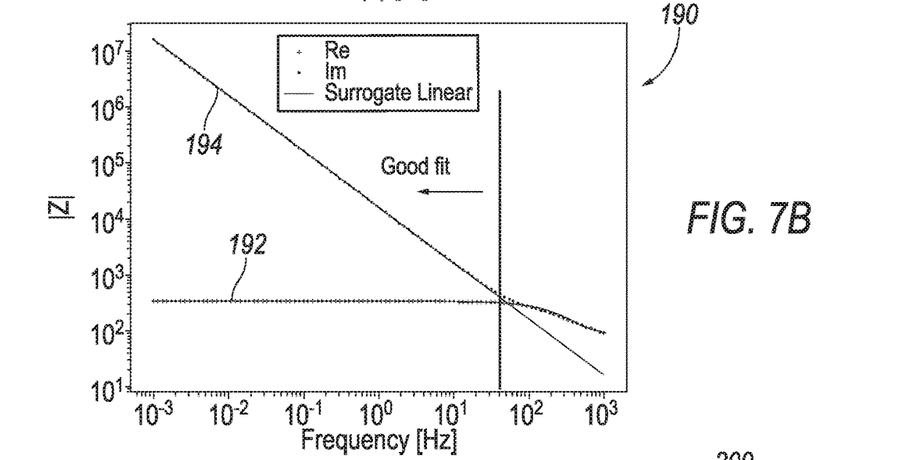
FIG. 7B illustrates a graph having a plot of the real impedance of the surrogate linear impedance data as a function of frequency and a plot of the imaginary impedance of the surrogate linear impedance data as a function of frequency.
Figure 7C:
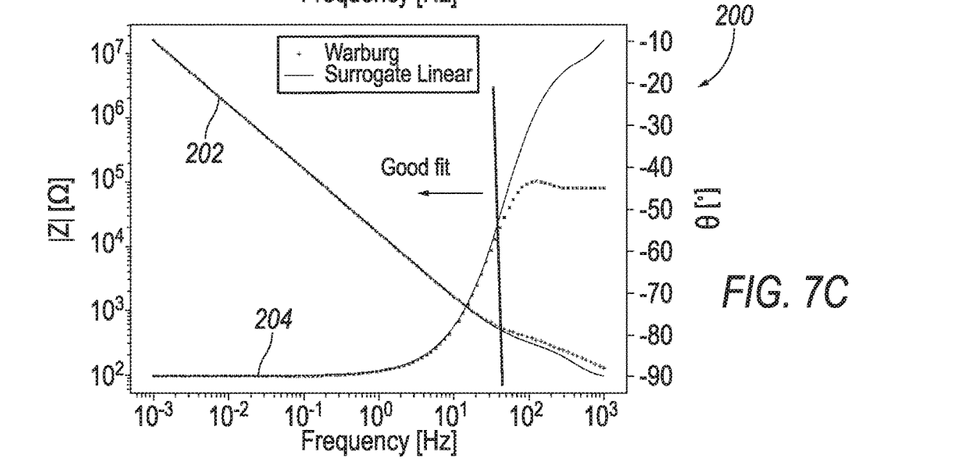
FIG. 7C illustrates a graph having a plot of the magnitude of the surrogate linear impedance data as a function of frequency and a plot of the phase angle of the surrogate linear impedance data as a function of frequency.

With respect to the third process, FIG. 7A illustrates a Nyquist graph 180 having a plot 182 of Warburg impedance data and a plot 184 of a surrogate linear impedance data. As shown in the Nyquist perspective, the reflective Warburg exhibits diagonal and near-vertical features. FIG. 7B illustrates a graph 190 having a plot 192 of the real part of the surrogate linear impedance data as a function of frequency and a plot 194 of the imaginary part of the surrogate linear impedance data as a function of frequency; and FIG. 7C illustrates a graph 200 having a plot 202 of the magnitude of the surrogate linear impedance data as a function of frequency and a plot 204 of the phase angle of the surrogate linear impedance data as a function of frequency.

In summary of the processes to semi-linearize circuit elements for DRT fitting, the present disclosure provides techniques for including non-linear circuit element functional forms in the Tikhonov regularization method for calculating the distribution of relaxation times. Functions describing the impedance of circuit elements, which are not linear in all fit parameters, can be used by separately fitting the non-linear parameter. The first process involves minimization of the DRT curve area to fit the non-linear variable. The second process involves partial fitting of the derivative of the function to extract the non-linear variable. The third process involves surrogate function form. The present disclosure further provides example applications of this technique for the diffusion limited part of the EIS impedance data curve for a traction battery.

As described, each of the three processes may be implemented by a controller for the controller to obtain an ECM based on comprehensive DRT information. In this way, the controller can calculate a complete traction battery ECM including distribution function of relaxation times. In turn, the controller may use the ECM to detect the internal state of the traction battery. Each of the three processes expands the traditional linearization-dependent DRT calculation algorithms to further include semi-linear circuit elements. The controller may be BECM 50, as described, or may be an off-board controller (i.e., a controller that is not a part of the vehicle such as a diagnostics controller located remotely from the vehicle in a service area).

Conventional solutions to the problem of parameterizing traction battery impedance data include (complex least-squares) fitting of an arbitrary ECM, and extraction of a DRT from data subsets or with a simplified battery model. The former method struggles to uniquely fit traction battery impedance data across all operating conditions for three reasons: 1) the number and type of equivalent circuit elements necessary to properly fit an arbitrary set of impedance data varies with measurement conditions; 2) battery models with many circuit elements include many parameters, and fit algorithms are sensitive to initial parameter values; and 3) quality of fit metrics do not discriminate degenerate fit situations where mildly incorrect, redundant, or overlapping circuit elements create interaction between or suppression of extracted fit parameters, thereby obscuring interesting physical meaning.

Each of the three processes according to the present disclosure uses a DRT circuit element that is flexible to fit all measurement conditions, minimizes the number of necessary circuit elements, and provides indication of poor fit or poor model choice. Conventional methods that use the DRT with simplified battery models or data subsets do not include all relevant circuit element characteristics or require arbitrary data pre-processing, and thereby introduce error by ignoring the contribution of these elements in places where impedance contributions overlap. Each of the three processes enables fitting the entire battery model and entire data set simultaneously, thereby minimizing error caused by ignorance of the precise equivalent circuit model or overlapping impedance contributions.

In conclusion, the processes provided by the present disclosure seek to overcome limitations in interpretation of EIS data, including automating the fitting procedure and reducing the error associated with initial value selection during fitting. Although it is intended that circuit elements be confined to certain frequency ranges (for instance, when conditions allow, initial fit values based on segments of EIS data at frequency limits are set), the processes provided by the present disclosure allow for a more flexible model through the inclusion of a distribution of relaxation times, and implementation of a hybrid-fitting algorithm that combines non-linear and linear fitting methods. This enables minimization of both the residual fit error as well as other features of the fit-such as the negative content and magnitude of the distribution of relaxation times. This multi-parameter minimization results in a fit that is flexible to accommodate all EIS curve shapes across all traction battery states, using a minimal number of circuit elements for reduced complexity, while still confining certain model features to frequency ranges thereby easing physical interpretation. Although interpretation of the distribution of relaxation times is an additional, complicated fitting problem, the processes provided by the present disclosure accommodate arbitrary equivalent circuit elements that have linear and non-linear terms, including those which describe diffusion. Significantly, including other features of the fit in the minimization enables evaluation of the model functional form.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments of the present disclosure.

What is claimed is:

1. A method for a vehicle having a traction battery, comprising:
managing charging and discharging of the traction battery based in part on a value of a non-linear circuit element of a model of the traction battery in which the value of the non-linear circuit element is estimated based in part on distribution of relaxation time (DRT) information of measured impedance data of the traction battery; and
minimizing a curve area of the DRT information to fit the non-linear circuit element to the measured impedance data to estimate the value of the non-linear circuit element according to the DRT information.

2. The method of claim 1 wherein:
the non-linear circuit element models a Warburg diffusion of the traction battery.

3. The method of claim 1 wherein:
the model of the traction battery is an equivalent circuit model having the non-linear circuit element and one or more linear circuit elements; and
the method further comprising managing the charging and the discharging of the traction battery based further in part on a value of each linear circuit element in which the value of each linear circuit element is estimated based in part on the DRT information.

4. The method of claim 1 wherein:
the model of the traction battery is an equivalent circuit model having the non-linear circuit element and one or more additional non-linear circuit elements; and
the method further comprising managing the charging and the discharging of the traction battery based further in part on a value of each additional non-linear circuit element in which the value of each additional non-linear circuit element is estimated based in part on the DRT information.

5. The method of claim 1 further comprising:
detecting, based in part on the estimated value of the non-linear circuit element, a power capability of the traction battery; and
controlling a vehicle component according to the power capability of the traction battery.

6. The method of claim 1 further comprising:
detecting, based in part on the estimated value of the non-linear circuit element, a state-of-charge (SOC) of the traction battery; and
controlling a vehicle component according to the SOC of the traction battery.

7. The method of claim 1 further comprising:
detecting, based in part on the estimated value of the non-linear circuit element, a distance-to-empty (DTE) estimation of the vehicle; and
controlling a vehicle component according to the DTE estimation of the vehicle.

8. A vehicle comprising:
a traction battery; and
a controller configured to estimate a value of a non-linear circuit element of a model of the traction battery based in part on distribution of relaxation time (DRT) information of measured impedance data of the traction battery and to manage charging and discharging of the traction battery based in part on the estimated value of the non-linear circuit element; and
the controller is further configured to provide a second model of the traction battery that includes only a single circuit element and to fit a derivative of a portion of the measured impedance data to the single circuit element of the second model to estimate the value of the non-linear circuit element according to the DRT information.

9. The vehicle of claim 8 wherein:
the controller is further configured to detect, based in part on the estimated value of the non-linear circuit element, a power capability of the traction battery, a state-of-charge (SOC) of the traction battery, and/or a distance-to-empty (DTE) estimation of the vehicle and to control a vehicle component according to the power capability of the traction battery, the SOC of the traction battery, or the DTE estimation of the vehicle.

10. The vehicle of claim 8 wherein:
the vehicle is a battery electric vehicle (BEV).

11. A system for a vehicle having a traction battery, comprising:
a controller configured to estimate a value of a non-linear circuit element of a model of the traction battery based in part on distribution of relaxation time (DRT) information of measured impedance data of the traction battery and to manage charging and discharging of the traction battery based in part on the estimated value of the non-linear circuit element; and
the controller is further configured to use a surrogate linear approximation of the non-linear circuit element to estimate the value of the non-linear circuit element according to the DRT information.

* * * * *